United States Patent [19]

Itoh et al.

[11] 3,868,654

[45] Feb. 25, 1975

[54] MEMORY CELL WITH HIGH THRESHOLD WRITING TRANSISTOR

[75] Inventors: Kiyoo Itoh, Kodaira; Katsuhiro Shimohigashi, Kokubunji; Keisuke Hashizume, Hachioji, all of Japan

[73] Assignee: Hitachi, Ltd., Chryoda-ku, Tokyo, Japan

[22] Filed: Oct. 23, 1973

[21] Appl. No.: 408,742

[30] Foreign Application Priority Data

Oct. 20, 1972 Japan .............................. 47-104452
Sept. 17, 1973 Japan .............................. 48-103848

[52] U.S. Cl. ........... 340/173 CA, 307/246, 307/279
[51] Int. Cl. ... G11c 11/24, G11c 7/00, G11c 11/40
[58] Field of Search ...... 340/173 CA; 307/238, 246, 307/279, 304

[56] References Cited

UNITED STATES PATENTS 3,774,177 11/1973 Schaffer ........................ 340/173 CA

*Primary Examiner*—Stuart N. Hecker
*Attorney, Agent, or Firm*—Craig & Antonelli

[57] ABSTRACT

A semiconductor memory comprises a dynamic type MOS memory cell with reading and writing transistors connected to the sense-digit line through one of the source/drain electrodes thereof and to one of the source/drain electrodes and gate electrodes of an information storage transistor through the other of the source/drain electrodes of reading and writing transistors. Both gate electrodes of the reading and the writing transistors are connected to the read/write select line, and the other of the source/drain electrodes of the information storage transistor is connected to the reference voltage source. The threshold voltage of the writing transistor is fixedly larger than the threshold voltage of both of the reading and information storage transistors.

4 Claims, 5 Drawing Figures

PRIOR ART

MEMORY CELL WITH HIGH THRESHOLD WRITING TRANSISTOR

BACKGROUND OF THE INVENTION

1. Description of the Prior Art

This invention relates to an MOS memory cell, especially of the type wherein a high bit density and high speed are required.

There exists, in the prior art, a circuit involving three elements with an attachment of 2.5 lines per bit, as illustrated in FIG. 1, which represents the conventional MOS memory cell.

Though this type of circuit design has assured a smaller area per cell, it has drawbacks in that the access time is significantly lengthened and the design of the driving circuit for a read/write select line RW is more difficult. The cause for this will be explained below with reference to the timing diagram illustrated in FIG. 2*a* and 2*b* for a circuit having an n-channel MOS device.

Such a type of cell, the circuit diagram of which is shown in FIG. 1, is constructed in a dynamic form, storing information "1" or "0" depending whether or not a charge is accumulated across the gate capacitance of MOS transistor $Q_3$, i.e., whether or not the gate voltage of MOS transistor $Q_3$ is high or low. The circuit operates as follows. First, a precharging of the circuit is accomplished just before the start of the reading operation. That is, the sense-digit line S is maintained at a high voltage level, which is maintained across capacitance $C_s$ of the sense-digit lines. During the readout cycle, a pulse of intermediate amplitude is applied to the read/write select line RW. If the gate voltage of MOS transistor $Q_3$ is at a high level, both MOS transistors $Q_1$ and $Q_3$ are controlled so that the voltage on the sense-digit line S is discharged through MOS transistors $Q_1$ and $Q_3$ to a level of zero volts. If, on the other hand, the gate voltage of MOS transistor $Q_3$ is at a low level, MOS transistor $Q_3$ is non-conducting and sense-digit line S is left at a high level. Thus, the information of a "1" or "0" can be identified by referring to the high or low voltage level on sense-digit line S that corresponds to the voltage present on the gate of MOS transistor $Q_3$. During the writing cycle, read/write select line RW is set at a high level, so that the voltage of sense-digit line S that carries the information is written on the gate of MOS transistor $Q_3$.

Now for such a circuit the intermediate level cannot be set arbitrarily during the reading cycle. During such a cycle write MOS transistor $Q_2$ must not be allowed to be so conducting that the voltage on gate of MOS transistor $Q_3$ may change; in other words, the information must be left intact. The requirement for non-destructive readout can be stated as follows. With the gate voltage of MOS transistor $Q_3$ at a low level, MOS transistor $Q_2$ may become conducting so that the high voltage to which sense line S has been precharged is written on the gate of MOS transistor $Q_3$, but such written voltage must not exceed threshold voltage $V_{th}$ of the transistor. Thus, it suffices that the read signal on read/write select line RW be below $2V_{th}$, for with a read signal larger than $2V_{th}$ on select line RW the gate voltage on MOS transistor $Q_3$ becomes larger than $V_{th}$, so that MOS transistor $Q_3$ becomes conducting contrary to the correct circuit operation. That is, the information is thereby destroyed at the instant when it is read out and, therefore, the voltage on sense-digit line S that should have duly been kept at a high level is discharged gradually to a low level, making an accurate identification of information impossible.

On the other hand, the lower limit of the voltage level of the readout signal should be higher than $V_{th}$ in view of the requirement that the reading MOS transistor $Q_1$ must be conducting. It follows from the above that the permissible voltage range for select line RW for the reading cycle is from $V_{th}$ to 2 $V_{th}$ with a width of variable range equal only to $V_{th}$ as shown by the solid line in FIG. 2*a*. Such a $V_{th}$ is usually about 1 to 3 V, so that the readout signal must be controlled within such a narrow range, thereby making the design of driving circuit for select line RW more difficult. Another drawback of this type of cell is the difficulty associated with the slow readout speed as shown by the solid line in FIG. 2*b*. Generally the time required for the discharging the voltage on the sense-digit line s to low level by transistors $Q_1$ and $Q_3$ can be taken to be roughly proportional to the gate voltage of transistor $Q_1$. Therefore, the fact that only the small amplitude $V_{th}$ is allowed for the voltage on select line RW during the readout cycle becomes a drawback in shortening the access time of the memory.

OBJECTS OF THE INVENTION

A main object of this invention is to provide a semiconductor memory which can shorten the access time.

Another object of this invention is to provide the memory which can make the area per cell smaller than in the prior art.

BRIEF DESCRIPTION OF THE INVENTION

This invention is characterized in that the signal amplitude applied during the readout cycle to read/write select line RW can be enlarged by setting the threshold voltage $V_{th}$ of transistor $Q_2$ larger than $V_{th}$ of transistors $Q_1$ and $Q_3$. Denoting the threshold voltage $V_{th}$ of transistors $Q_1$ and $Q_3$ by $V_{th_1}$ and $V_{th}$ of transistor $Q_2$ by $V_{th_2}$, it follows, from the same reasoning as above, that the allowable range of the voltage on the read/write select line RW lies from $V_{th_1}$ to $V_{th_1} + V_{th_2}$. Thus, for a larger $V_{th_2}$ of transistor $Q_2$, the wider the allowable range of signal voltage and the higher the allowable signal voltage itself will be, so that the information can be read out at high speed with sense-digit line S; also the design of the driving circuit for read/write select line RW is simplified. Such a feature is indicated in FIGS. 2*a* and 2*b* by dotted lines.

Another feature of this invention is that, in designing this invention having a memory with the same access time as that of the conventional memory, the conductances of transistors $Q_1$ and $Q_2$ can be lowered as much as the voltage of read/write select line RW is elevated from the conventional value. This means that the memory cell can be fabricated in a smaller area compared to the conventional memory, so that a less expensive memory with the same performance can be provided.

During the writing cycle, the writing operation can be effected with the design according to this invention as speedly as with the conventional design, if read/write select line RW is set at a high level. A larger threshold voltage $V_{th}$ of transistor $Q_2$ can be achieved by ion implantation into the channel formation between n-type source and drains C formed on a p-type substrate *d* just beneath the gate *a* of MOS transistor (FIG. 3) or by thickening the insulation layer *b* of the gate *a*.

It is clear from the above that a high speed and inexpensive memory cell can be provided according to the present invention.

Furthermore, this invention has an advantage that its refresh time is lengthened compared to the conventional design, for the phenomenon that the charge stored on memory cell is discharged into the sense-digit lines can be inhibited in this circuit design by the small voltage that appears on the read/write select line RW during the non-select cycle when the threshold voltage $V_{th_2}$ of writing transistor $Q_2$ is raised.

BRIEF DESCRIPTION OF THE DRAWINGS

In FIG. 1, when the high voltage level is written on the gate of MOS transistor $Q_3$, it is desirable to set the level to be as high as possible from the point of view of the S/N ratio. For the conventional memory cell in which all the transistors involved share the same threshold voltage $V_{th}$, such a written voltage $V_S$ has the relations as indicated by curves A and B in FIG. 4 compared to the word writing voltage $V_w$ that is applied to select line RW during the writing cycle. $Q_0$ thereof is the writing MOS transistor commonly arranged with a number of memory cells on the sense-digit lines to write the high voltage level, the high voltage $V_D$ or low voltage O V being applied to the gate of MOS transistor $Q_O$ according to whether the high voltage level or low voltage level is written in the memory. With this type of memory cell, in general, when the high level is written in the cell, that is, when $V_D$ is applied to both select line RW and the gate of MOS transistor $Q_O$, a voltage that depends on the ratio between the conductance of transistor $Q_O$ and the equivalent conductance comprising the conductances of transistors $Q_1$ and $Q_2$ appears on sense-digit line S. Thus, B in FIG. 4 denotes the zone where the voltage that appears on such sense-digit line S due to the large value of word writing voltage $V_w$ is conveyed to the gate of transistor $Q_3$ as it is, while A marks the zone where the voltage of sense-digit line S does not coincide with the gate voltage of transistor $Q_3$. Now, raising the threshold voltage of transistor $Q_2$ to $V_{th_2}$ means that the characteristics of the circuit are represented by curve C in FIG. 4. There is an upper limit to $V_{th_2}$, since the maximum value of the word writing voltage $V_w$ is usually approximately equivalent to the drain voltage $V_{DD}$ of transistor $Q_O$, if $V_{th_2}$ is elevated above the level that is given in FIG. 4 as $V_{th_2}$ to shift the characteristics to curve D, the written voltage $V_s$ drops to $V_{sl}$, deteriorating the S/N ratio. The upper limit to the threshold voltage $V_{th_2}$ of transistor $Q_2$ is therefore defined by point P. That is, the upper limit to threshold voltage $V_{th_2}$ is selected in the range where gate voltage $V_s$ stays at a constant level, regardless of the word writing voltage $V_W$ which is applied to select line RW during the writing cycle, only when the word writing voltage $V_W$ is set higher than the voltage approximately equivalent to supply voltage $V_{DD}$. Thus, the high-speed readout operation becomes feasible without deteriorating the S/N ratio by selecting the transistor $Q_2$ with threshold voltage $V_{th_2}$ in the range defined above.

Figure 1:
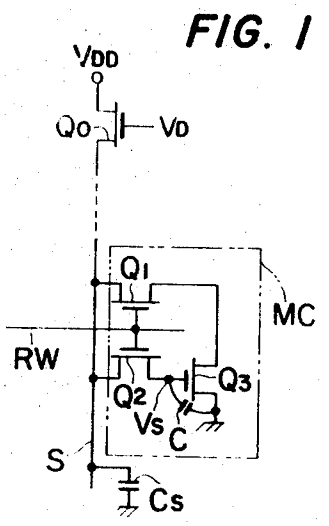
FIG. 1 PRIOR ART
FIG. 1 is a circuit diagram of a semiconductor memory cell in relation to the present invention.
Figures 2A, 2B:
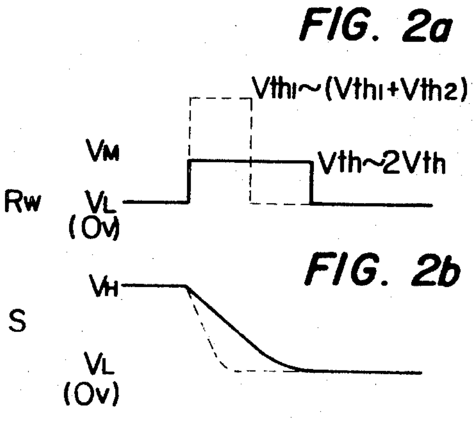
FIGS. 2*a* and 2*b* depict the waveform of a word reading voltage applied to a read/write select line and the waveform of a readout voltage on a sense digit line according to the prior art and according to the present invention, respectively.
Figure 3:
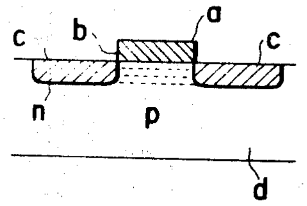
FIG. 3 is a diagram explaining the construction of the writing transistor in a memory cell according to the present invention.
Figure 4:
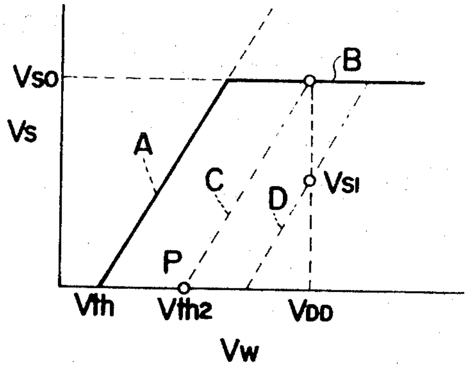
FIG. 4 is a characteristic diagram showing a range of threshold voltages of the writing transistor in a memory cell according to the present invention.

While we have shown and described several embodiments in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What we claim is:

1. In a semiconductor memory including:

at least one memory cell having a reading transistor, a writing transistor, and an information storage transistor, each transistor having an input electrode, an output electrode, and a control electrode, the output electrodes of said reading transistor and writing transistor being respectively connected to the output electrode and control electrode of said information storage transistor;

a sense-digit line connected to the input electrodes of each of said reading and writing transistors;

a select-line connected to the control electrodes of each of said reading and writing transistors; and a terminal for coupling a source of reference potential to the input electrode of said information storage transistor; and the improvement wherein the threshold voltage of said writing transistor, at which threshold voltage a current conductive path is established between the input and output electrodes of said writing transistor, is fixedly larger than the threshold voltage of said reading and information storage transistors.

2. The improvement according to claim 1, wherein each of said transistors is an insulated gate field effect transistor, with the input and output electrodes thereof corresponding to the source and drain of said transistors, and the control electrodes thereof corresponding to the gate electrodes of said field effect transistors.

3. The improvement according to claim 1, wherein the upper limit of the threshold voltage of said writing transistor lies in the range where the voltage at the control electrode of said information storage transistor remains at a constant level, regardless of the word voltage applied to said select line during the writing cycle of said memory, only when said word voltage is larger than a voltage corresponding to the supply voltage applied to said sense-digit line.

4. The improvement according to claim 3, wherein each of said transistors is an insulated gate field effect transistor, with the input and output electrodes thereof corresponding to the source and drain of said transistors, and the control electrodes thereof corresponding to the gate electrodes of said field effect transistors.

* * * * *